US010375588B2

(12) United States Patent
Zhu et al.

(10) Patent No.: US 10,375,588 B2
(45) Date of Patent: Aug. 6, 2019

(54) WIRELESS COMMUNICATIONS SYSTEM MANAGEMENT METHOD AND RELATED APPARATUS

(71) Applicant: Huawei Technologies Co., Ltd., Shenzhen (CN)

(72) Inventors: Shoucai Zhu, Shanghai (CN); Yu Yin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/618,370

(22) Filed: Jun. 9, 2017

(65) Prior Publication Data
US 2017/0280340 A1 Sep. 28, 2017

Related U.S. Application Data

(63) Continuation of application No. PCT/CN2014/093494, filed on Dec. 10, 2014.

(51) Int. Cl.
| | |
|---|---|
| *H04W 24/02* | (2009.01) |
| *H04W 24/04* | (2009.01) |
| *H04W 28/14* | (2009.01) |
| *H04W 76/00* | (2018.01) |
| *H04W 48/14* | (2009.01) |

(52) U.S. Cl.
CPC .......... *H04W 24/04* (2013.01); *H04W 24/02* (2013.01); *H04W 76/00* (2013.01); *H04W 48/14* (2013.01)

(58) Field of Classification Search
CPC .............................. H04W 24/04; H04W 24/02
See application file for complete search history.

(56) References Cited

U.S. PATENT DOCUMENTS

| | | | | |
|---|---|---|---|---|
| 2010/0091676 A1* | 4/2010 | Moran | ............... | H04L 47/10 370/252 |
| 2010/0210288 A1* | 8/2010 | Kim | ............... | H04W 68/02 455/458 |
| 2011/0310804 A1* | 12/2011 | Beygzadeh | ............... | H04W 68/00 370/328 |

(Continued)

FOREIGN PATENT DOCUMENTS

| | | |
|---|---|---|
| CN | 101932066 A | 12/2010 |
| CN | 102469551 A | 5/2012 |

(Continued)

OTHER PUBLICATIONS

"3rd Generation Partnership Project; Technical Specification Group Radio Access Network; Evolved Universal Terrestrial Radio Access Network (E-UTRAN); S1 Application Protocol (S1AP) (Release 12)"; 3GPP TS 36.413 V12.3.0, Sep. 2014; 290 pages.

(Continued)

*Primary Examiner* — Qun Shen

(57) ABSTRACT

Embodiments of the present invention provide a wireless communications system management method and a related apparatus. A radio access network element management device may obtain a group identifier of a radio access network element, determine, according to a correspondence between a grouping rule and the group identifier, a group to which the radio access network element belongs, and use, based on a group, a processing policy corresponding to the group to which the radio access network element belongs, thereby performing service management by group.

20 Claims, 8 Drawing Sheets

(56) References Cited

U.S. PATENT DOCUMENTS

| | | | |
|---|---|---|---|
| 2012/0295643 A1* | 11/2012 | Arvidsson | H04W 68/04 455/458 |
| 2013/0223290 A1* | 8/2013 | Zhou | H04L 12/1407 370/259 |
| 2014/0057566 A1* | 2/2014 | Watfa | H04W 48/16 455/41.2 |
| 2014/0112251 A1* | 4/2014 | Kim | H04W 4/70 370/328 |
| 2015/0201394 A1* | 7/2015 | Qu | H04W 4/02 455/456.1 |
| 2015/0229430 A1* | 8/2015 | Liang | H04J 14/0242 398/68 |
| 2016/0007170 A1* | 1/2016 | Vaidya | H04W 64/003 370/312 |
| 2016/0125674 A1* | 5/2016 | Wohlgemuth | G07C 5/08 701/29.3 |

FOREIGN PATENT DOCUMENTS

| | | |
|---|---|---|
| RU | 2013102525 A | 7/2014 |
| WO | 2014008630 A1 | 1/2014 |
| WO | 2014031713 A1 | 2/2014 |

OTHER PUBLICATIONS

CATT; "RRC Connection Control for MTC Device"; 3GPP TSG RAN WG2 Meeting #71bis; R2-105387; Xi'an, China; Oct. 11-15, 2010; 4 pages.

Vodafone; "On the Need for New Establishment Causes for Devices Configured for MTC-LTE"; 3GPP TSG RAN WG2 #71bis; R2-105484; Xi'an, China, Oct. 11-15, 2010; 7 pages.

Alcatel-Lucent; "Discussion on LTE solutions for MTC"; 3GPP TSG-RAN WG2 Meeting #71b; R2-105660; Xi'an, China, Oct. 11-15, 2010; 4 pages.

* cited by examiner

WIRELESS COMMUNICATIONS SYSTEM MANAGEMENT METHOD AND RELATED APPARATUS

CROSS-REFERENCE TO RELATED APPLICATIONS

This application is a continuation of International Application No. PCT/CN2014/093494, filed on Dec. 10, 2014, the disclosure of which is hereby incorporated by reference in its entirety.

TECHNICAL FIELD

The present invention relates to the field of communications technologies, and in particular, to a wireless communications system management method and a related apparatus.

BACKGROUND

Development of mobile communications technologies undergoes multiple phases, such as a first generation mobile communications technology, a second generation (2G) mobile communications technology, a third generation (3G) mobile communications technology, and a Long Term Evolution (LTE) communications technology (also referred to as a 3.9G/4G communications technology). Upon rapid development of the mobile communications technologies, a mobile network architecture also changes accordingly. A 2G network architecture generally includes a GSM/EDGE (Global System for Mobile Communication/Enhanced Data Rate for GSM Evolution) radio access network (GSM/EDGE radio access network, GERAN) and a core network. The GERAN includes network elements such as a base transceiver station (BTS) and a base station controller (BSC), and the core network includes network elements such as a Serving GPRS Support Node (SGSN), a Gateway GPRS Support Node (GGSN), and a Home Location Register (HLR). A 3G network architecture generally includes a UMTS Terrestrial Radio Access Network (UTRAN) and a core network. The UTRAN includes network elements such as a NodeB and a Radio Network Controller (RNC), and the core network includes network elements such as an SGSN, a GGSN, and an HLR. An LTE network architecture generally includes an Evolved Universal Terrestrial Radio Access Network (E-UTRAN) and a core network. The E-UTRAN includes an E-UTRAN NodeB (eNodeB) network element, and the core network includes network elements such as a Mobility Management Entity (MME), a Serving Gateway (SGW), a Packet Data Network Gateway (PGW), and a Home Subscriber Server (HSS).

According to an architecture of an LTE-evolved packet core (EPC) network defined in the 3rd Generation Partnership Project (3GPP), it can be learned that compared with a 2G or 3G network architecture, the LTE network architecture has a relatively large change. That is, in the LTE network architecture, an access network element eNodeB may be directly connected to core network elements MME and SGW, while in the 2G or 3G network architecture, an access network element cannot be directly connected to a core network element. Currently, with development and commercial use of the LTE network, an eNodeB has various forms, including a macro eNodeB, a pico eNodeB, a cloud eNodeB, and the like. eNodeB deployment is developing towards hierarchical deployment and deployment in different areas, such as a dedicated network eNodeB, a campus network, a mobile eNodeB, an indoor eNodeB, a bus hotspot, and a customized service eNodeB. Services carried in the LTE-EPC also become richer, such as a voice service, a packet data service, a location service, and an evolved multimedia broadcast/multicast service. Therefore, some specific eNodeBs are dedicated to carrying some specific services. For example, an eNodeB of a time division duplex type is configured to carry a data service, and an eNodeB of a frequency division duplex type is configured to carry a voice service.

Because of a flattened network architecture of an LTE-EPC system, diversified eNodeB deployment forms, and diversified services, there are increasingly more challenges in service management of the LTE-EPC system, and consequently, management efficiency is low, and management is quite difficult. For example, (1) a network element such as an MME, SGW, Network Management System (NMS) or Element Management System (EMS) needs to manage massive eNodeBs, and if an eNodeB network plan is adjusted (for example, site expansion or tracking area identity adjustment), maintenance data of a network device changes, and consequently, network operation and maintenance is quite difficult, operation and maintenance efficiency is low, and operation and maintenance costs are high; (2) in a scenario in which a radio bearer network fails, massive eNodeB link alarm information is generated, impacting the network, and therefore, network optimization is difficult to perform; (3) in a mobile Internet era, a user such as a smartphone generates a large amount of signaling (for example, connection establishment, connection release, or user paging), and consequently, great signaling impact may be centrally imposed on eNodeBs of some forms or some performance, and unified control and management is difficult to perform; (4) when some eNodeBs are dedicated to carrying some services, a same user network camping policy may need to be used on user equipment connected to an eNodeB carrying some services, and therefore, implementation complexity is high; (5) when a user service is deployed based on an eNodeB (for example, free data traffic is used for user equipment connected to a pico eNodeB), service configuration data needs to be adjusted during eNodeB adjustment, and consequently, operation and maintenance work of service deployment is heavy.

SUMMARY

For the foregoing problem in the prior art, embodiments of the present invention provide a wireless communications system management method and a related apparatus, so as to group radio access network elements, and perform management by group, thereby effectively improving efficiency.

According to a first aspect, an embodiment of the present invention provides a wireless communications system management method, where the method includes:

obtaining, by a radio access network element management device, a group identifier of a radio access network element;

determining, by the radio access network element management device according to a correspondence between a grouping rule and the group identifier, a group to which the radio access network element belongs; and using, by the radio access network element management device, a processing policy corresponding to the group to which the radio access network element belongs, where the group identifier is used to indicate at least one attribute of an attribute of an area in which the radio access network element is located, an attribute of a network standard of the radio access network element, an attribute of a service area in which the radio access network element is located, an attribute of a radio access technology type of the radio access network element, an attribute of an access frequency of the radio access network element, a network element form attribute of the radio access network element, a deployment form attribute of the radio access network element, a network element home attribute of the radio access network element, a network element service application attribute of the radio access network element, or a network element performance attribute of the radio access network element.

With reference to the first aspect, in a first possible implementation manner, the obtaining, by a radio access network element management device, a group identifier of a radio access network element specifically includes: receiving, by the radio access network element management device, the group identifier that is sent by the radio access network element when the radio access network element is connected to the radio access network element management device; or receiving, by the radio access network element management device, the group identifier that is sent by the radio access network element when the radio access network element restarts; or receiving, by the radio access network element management device, the group identifier that is sent by the radio access network element when configuration in the radio access network element is updated; or receiving, by the radio access network element management device, the group identifier that is sent by the radio access network element when the group identifier is updated.

With reference to the first aspect or the first possible implementation manner of the first aspect, in a second possible implementation manner, the using, by the radio access network element management device, a processing policy corresponding to the group to which the radio access network element belongs includes: using, by the radio access network element management device, the processing policy on all radio access network elements in the group to which the radio access network element belongs; or using, by the radio access network element management device, the processing policy on user equipment getting connected by using a radio access network element in the group to which the radio access network element belongs.

According to a second aspect, an embodiment of the present invention provides a radio access network element management device, including:

a receiving unit, configured to obtain a group identifier of a radio access network element; and a processing unit, configured to determine, according to a correspondence between a grouping rule and the group identifier, a group to which the radio access network element belongs; and use a processing policy corresponding to the group to which the radio access network element belongs, where the group identifier is used to indicate at least one attribute of an attribute of an area in which the radio access network element is located, an attribute of a network standard of the radio access network element, an attribute of a service area in which the radio access network element is located, an attribute of a radio access technology type of the radio access network element, an attribute of an access frequency of the radio access network element, a network element form attribute of the radio access network element, a deployment form attribute of the radio access network element, a network element home attribute of the radio access network element, a network element service application attribute of the radio access network element, or a network element performance attribute of the radio access network element.

With reference to the second aspect, in a first possible implementation manner, the receiving unit is specifically configured to: receive the group identifier that is sent by the radio access network element when the radio access network element is connected to the radio access network element management device; or receive the group identifier that is sent by the radio access network element when the radio access network element restarts; or receive the group identifier that is sent by the radio access network element when configuration in the radio access network element is updated; or receive the group identifier that is sent by the radio access network element when the group identifier is updated.

With reference to the second aspect, or the first possible implementation manner of the second aspect, in a second possible implementation manner, the processing unit is specifically configured to use the processing policy on all radio access network elements in the group to which the radio access network element belongs; or use the processing policy on user equipment getting connected by using a radio access network element in the group to which the radio access network element belongs.

According to a third aspect, an embodiment of the present invention provides a radio access network element management device, including a bus, and a processor, a storage, a transmitter, and a receiver that are connected to the bus, where:

the storage is configured to store a computer-executable instruction, where the computer-executable instruction is configured to be executed by the processor;

the receiver is configured to obtain a group identifier of a radio access network element; and the processor is configured to determine, according to a correspondence between a grouping rule and the group identifier, a group to which the radio access network element belongs; and use a processing policy corresponding to the group to which the radio access network element belongs, where the group identifier is used to indicate at least one attribute of an attribute of an area in which the radio access network element is located, an attribute of a network standard of the radio access network element, an attribute of a service area in which the radio access network element is located, an attribute of a radio access technology type of the radio access network element, an attribute of an access frequency of the radio access network element, a network element form attribute of the radio access network element, a deployment form attribute of the radio access network element, a network element home attribute of the radio access network element, a network element service application attribute of the radio access network element, or a network element performance attribute of the radio access network element.

With reference to the third aspect, in a first possible implementation manner, the receiver is specifically configured to: receive the group identifier that is sent by the radio access network element when the radio access network element is connected to the radio access network element management device; or receive the group identifier that is sent by the radio access network element when the radio access network element restarts; or receive the group identifier that is sent by the radio access network element when configuration in the radio access network element is updated; or receive the group identifier that is sent by the radio access network element when the group identifier is updated.

With reference to the third aspect, or the first possible implementation manner of the third aspect, in a second possible implementation manner, the processor is specifically configured to use the processing policy on all radio access network elements in the group to which the radio access network element belongs; or use the processing policy on user equipment getting connected by using a radio access network element in the group to which the radio access network element belongs.

Optionally, in anyone of the foregoing aspects or any possible embodiment of any one of the foregoing aspects, the group identifier is at least one of an identity ID of the radio access network element, a name Name of the radio access network element, a link identifier of the radio access network element, an Internet Protocol IP address of the radio access network element, or an area attribute identifier of the radio access network element.

Optionally, in anyone of the foregoing aspects or any possible embodiment of anyone of the foregoing aspects, the processing policy is an operation and maintenance policy, an application policy, or a wireless parameter configuration policy, where:

the operation and maintenance policy includes at least one of a performance indicator policy, a fault reporting policy, a signaling tracing policy, or a parameter configuration policy;

the application policy includes at least one of a data flow control policy, a device access policy, a network-side device weight information delivery policy, a resource allocation policy, a functional characteristic deployment policy, or a charging policy; or the application policy includes at least one of a paging policy, a tracking area identity list TAList allocation policy, a user equipment identity allocation policy, an access point name APN allocation policy, a quality of service QoS allocation policy, a policy for delivering a subscriber profile ID SPID for a radio access technology/frequency selection priority, an area handover restriction policy, a voice policy, a user location reporting policy, a serving gateway SGW/packet data network gateway PGW selection policy, or a user authentication policy, where the user equipment identity includes but is not limited to a globally unique temporary identity GUTI, a mobility management entity code MMEC, a mobility management entity group identifier MMEGI, or a public land mobile network PLMN; and the wireless parameter configuration policy includes configuration data for a user network camping priority, configuration data for power control, configuration data for user connection management, configuration data for wireless coverage, or configuration data for cell management.

According to the wireless communications system management method provided in the embodiments of the present invention, a radio access network element management device may obtain a group identifier of a radio access network element, determine, according to a correspondence between a grouping rule and the group identifier, a group to which the radio access network element belongs, and use, based on a group, a processing policy corresponding to the group to which the radio access network element belongs, so that a same processing policy may be used on all radio access network elements in the group, or a same processing policy may be used on all user equipment getting connected by using a radio access network element in the group, and different processing policies may further be applied to different groups. This implements differentiated management by group, and effectively improves efficiency in aspects such as network operation and maintenance, wireless parameter configuration, network optimization, and function deployment.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION

Embodiments of the present invention provide a wireless communications system management method, so as to group radio access network elements, and perform management by group. This effectively improves efficiency in aspects such as operation and maintenance, network optimization, configuration, and function deployment. The embodiments of the present invention further provide a corresponding device.

Figure 1:
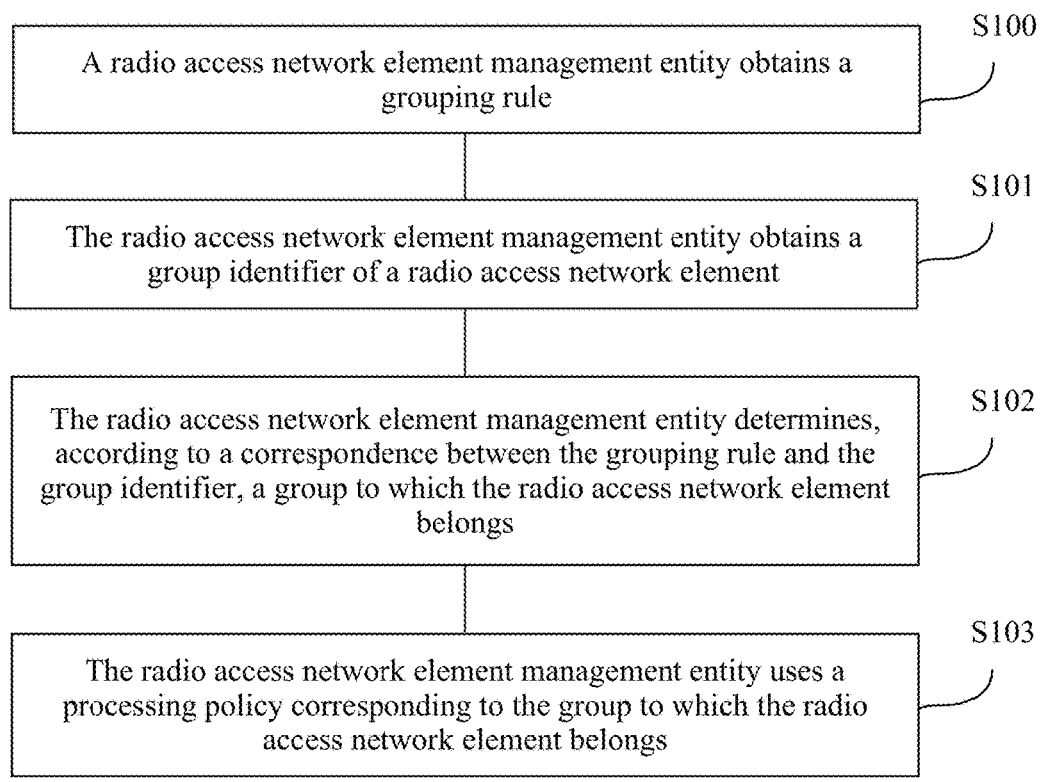
FIG. 1 is a flowchart of a wireless communications system management method according to an embodiment of the present invention.

As shown in FIG. 1, an embodiment of the present invention provides a wireless communications system management method.

S101. A radio access network element management device obtains a group identifier of a radio access network element.

Characteristics such as various forms, hierarchical deployment, deployment in different areas of radio access network elements, and diversified services may be taken into consideration when the radio access network element management device groups radio access network elements, so that the radio access network elements may be grouped in terms of different forms, different deployment areas, or different deployment hierarchies. Therefore, the group identifier may reflect a related attribute of the radio access network element. For example, the group identifier may be used to indicate at least one of the following attributes:

(1) The group identifier may be used to indicate an attribute of an area in which the radio access network element is located. The attribute of the area in which the radio access network element is located may reflect a characteristic of a geographic location of the radio access network element. For example, the attribute of the area in which the radio access network element is located is a commercial district, a common downtown area, a suburb area, a rural wide land, an enterprise zone, a campus area, a dedicated-network area, a network operation and maintenance administrative region, or the like.

(2) The group identifier may be used to indicate an attribute of a network standard of the radio access network element. The attribute of the network standard of the radio access network element may indicate a network node that is used by the radio access network element to perform communication. For example, the attribute of the network standard of the radio access network element is LTE-time division duplex (TDD) or LTE-frequency division duplex (FDD).

(3) The group identifier may be used to indicate an attribute of a radio access technology type of the radio access network element. The attribute of the radio access technology type of the radio access network element is used to reflect an access technology type that is supported by the radio access network element. For example, the attribute of the radio access technology type of the radio access network element is a GSM/UMTS access technology, an LTE access technology, a GSM/UMTS/LTE access technology, a CDMA/LTE access technology, or the like.

(4) The group identifier may be used to indicate an attribute of an access frequency of the radio access network element. The attribute of the access frequency of the radio access network element is an access frequency corresponding to an access technology supported by the radio access network element. For example, the attribute of the access frequency of the radio access network element is GSM 850/900/1800/1900 MHz, LTE 1900/2300/2600 MHz, or the like.

(5) The group identifier may be used to indicate a network element form attribute of the radio access network element. The network element form attribute of the radio access network element may refer to a scale of the radio access network element. For example, the network element form attribute of the radio access network element is an extremely large NodeB, a common NodeB, a small NodeB, a pico NodeB, or the like.

(6) The group identifier may be used to indicate a deployment form attribute of the radio access network element. The deployment form attribute of the radio access network element may reflect a deployment characteristic of the radio access network element. For example, the deployment form attribute of the radio access network element is a common macro base station, a cloud base station, a base station access gateway, a home NodeB, or the like.

(7) The group identifier may be used to indicate a network element service application attribute of the radio access network element. The network element service application attribute of the radio access network element may reflect a deployed service capability of the radio access network element. For example, the network element service application attribute of the radio access network element is a location service (LCS), an evolved multimedia broadcast/multicast service (eMBMS), a voice service, or the like.

(8) The group identifier may be used to indicate a network element home attribute of the radio access network element. The network element home attribute of the radio access network element is used to reflect an operator to which the radio access network element belongs. For example, a home operator of the radio access network element is Mobile, Unicom, Telecom, or the like.

(9) The group identifier may be used to indicate a network element performance attribute of the radio access network element. The network element performance attribute of the radio access network element may reflect a processing capability of the radio access network element. For example, the network element performance attribute of the radio access network element is information about a maximum signaling processing capability of the radio access network element, information about a maximum data forwarding capability of the radio access network element, information about a maximum coverage capability of the radio access network element, information about a maximum user wireless connection specification of the radio access network element, or the like.

(10) The group identifier may be used to indicate an attribute of a service area in which the radio access network element is located. The attribute of the service area in which the radio access network element is located may be an identifier of a service area (Service Area Identifier) including one or more cells, or may be an identifier of a service area including one or more eNodeBs. An operator may deploy a service function based on the service area.

Optionally, the group identifier may be a character or a character string indicating at least one of the foregoing attributes. For example, the group identifier may be a character string 0010, where 00 is used to indicate that the attribute of the network standard of the radio access network element is the LTE-FDD, and 10 is used to indicate that the attribute of the area in which the radio access network element is located is a commercial district. For another example, the group identifier may be at least one of an identity (ID) of the radio access network element, a name of the radio access network element, a link identifier of the radio access network element, an Internet Protocol (IP) address of the radio access network element, or an area attribute identifier of the radio access network element.

S102. The radio access network element management device determines, according to a correspondence between a grouping rule and the group identifier, a group to which the radio access network element belongs.

The radio access network element management device may determine the grouping rule according to the correspondence between the grouping rule and the group identifier, and determine, by using the grouping rule, the group to which the radio access network element belongs. It may be defined in the grouping rule that when the group identifier meets a specific condition, a corresponding radio access network element group is determined. Therefore, the group to which the radio access network element belongs may be determined by means of condition determining or matching by using the group identifier. Alternatively, the grouping rule may include a correspondence between the group identifier and the group to which the radio access network element belongs, so that the group to which the radio access network element belongs may be determined according to the correspondence.

S103. The radio access network element management device uses a processing policy corresponding to the group to which the radio access network element belongs.

In a case such as after the group to which the radio access network element belongs is determined, or when a trigger condition is met, or when the group to which the radio access network element belongs exists, or when there is a corresponding requirement, the radio access network element management device may use the processing policy corresponding to the group to which the radio access network element belongs. Specifically, the radio access network element management device may use the processing policy on all radio access network elements in the group to which the radio access network element belongs (that is, use the processing policy on the group to which the radio access network element belongs); or the radio access network element management device may use the processing policy on user equipment getting connected by using a radio access network element in the group to which the radio access network element belongs. The processing policy may be specifically an operation and maintenance policy, an application policy, or a wireless parameter configuration policy. Therefore, the radio access network element management device may apply different processing polices to different groups. This effectively improves efficiency in aspects such as network operation and maintenance, wireless parameter configuration, network optimization, and function deployment.

Different from a solution in the prior art in which group information of a radio access network element cannot be sensed, and management can only be performed in a granularity of a radio access network element, the radio access network element management device in this embodiment of the present invention may obtain a group identifier of a radio access network element, and determine, according to a correspondence between a grouping rule and the group identifier, a group to which the radio access network element belongs. Therefore, a same processing policy may be applied to the group to which the radio access network element belongs or user equipment getting connected to a network by using the radio access network element, and different processing policies may be applied to different groups. The processing policy may be specifically an operation and maintenance policy, an application policy, or a wireless parameter configuration policy. This effectively improves efficiency in aspects such as network operation and maintenance, wireless parameter configuration, network optimization, and function deployment.

Optionally, before step S102, the method may further include:

S100. The radio access network element management device obtains the grouping rule.

The grouping rule may be obtained in multiple manners. For example, the grouping rule may be pre-configured in the radio access network element management device. For another example, the radio access network element management device may generate the grouping rule according to requirement information such as a related attribute of the radio access network element. For another example, the radio access network element management device may receive the grouping rule that is sent by another network element (such as an EMS or an NMS). No limitation is imposed on this in this embodiment of the present invention.

In embodiments of the present invention, the radio access network element may be an eNodeB of an LTE network, or may be a NodeB or a BTS of a 2G or 3G network, or may be a radio access network element of a next generation (such as 4.5G or 5G), or may be a radio access network element of another future network standard. The radio access network element management device may be an MME, an SGW, a PGW, an EMS, or an NMS of an LTE network, or may be a radio network controller RNC or a BSC of a 2G or 3G network, or may be a network element of a next generation (such as 4.5G or 5G), or may be a network element of another future network standard.

To describe the embodiments of the present invention more clearly, the following uses that the radio access network element is an eNodeB and the radio access network element management device is an MME as an example for description with reference to the accompanying drawings 2 to 4; uses that the radio access network element is an eNodeB and the radio access network element management device is an SGW/PGW as an example for description with reference to the accompanying drawings 5 and 6; and uses that the radio access network element is an eNodeB and the radio access network element management device is an EMS/NMS as an example for description with reference to the accompanying drawing 7. For another case in which the radio access network element is not an eNodeB, or the radio access network element management device is not an MME/SGW/PGW/EMS/NMS, reference may be made to embodiments corresponding to the accompanying drawings 2 to 7, and details are not described herein in the embodiments of the present invention.

Figure 2:
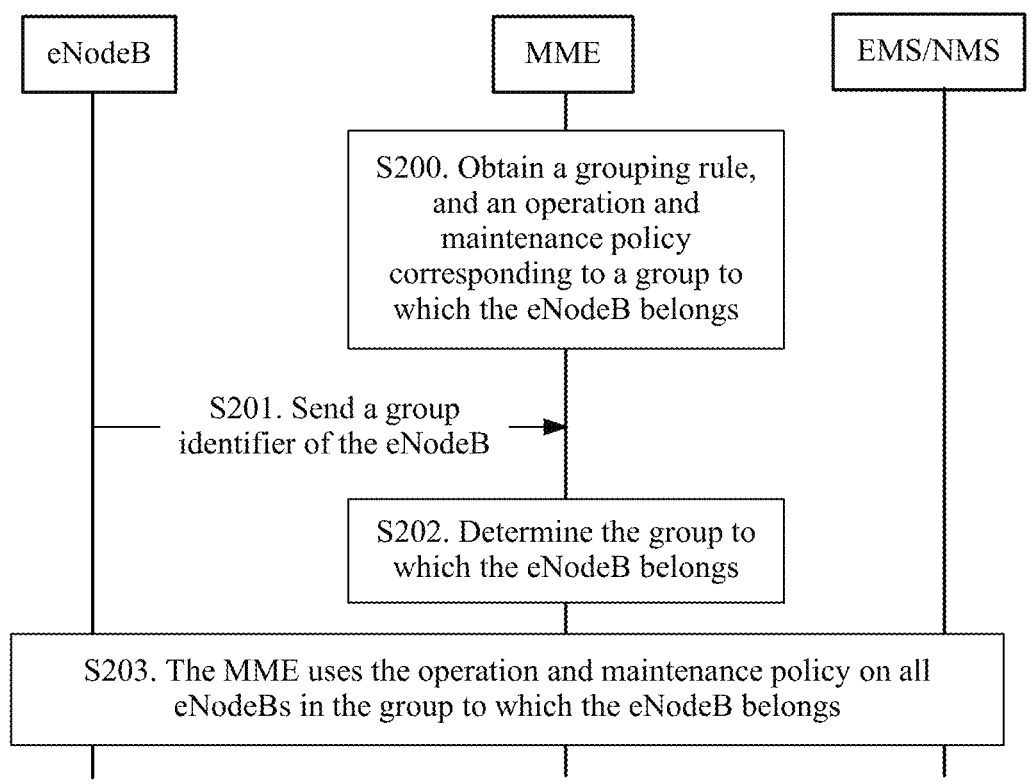
FIG. 2 is a flowchart of another wireless communications system management method according to an embodiment of the present invention.

As shown in FIG. 2, an embodiment of the present invention provides a wireless communications system management method.

S200. An MME obtains a grouping rule, and an operation and maintenance policy corresponding to a group to which an eNodeB belongs.

In step S200, the MME may obtain the grouping rule pre-configured in the MME; or the MME may obtain the operation and maintenance policy that is corresponding to the group to which the eNodeB belongs and that is pre-configured in the MME; or the MME may generate the grouping rule according to requirement information such as a related attribute of the eNodeB; or the MME may generate, according to an operation and maintenance requirement, the operation and maintenance policy corresponding to the group to which the eNodeB belongs; or the MME may receive the grouping rule; or the MME may receive the processing policy corresponding to the group to which the eNodeB belongs. No limitation is imposed on this in this embodiment of the present invention.

S201. The eNodeB sends a group identifier of the eNodeB to the MME.

The eNodeB may send the group identifier of the eNodeB to the MME when the eNodeB is initially connected to the MME, or may send the group identifier of the eNodeB to the MME when the eNodeB restarts or when configuration is updated, or may send an updated group identifier of the eNodeB to the MME when the group identifier of the eNodeB is updated. Therefore, the eNodeB may send the group identifier of the eNodeB to the MME by using a device registration message, a configuration update message, or a service interaction message, where the device registration message, the configuration update message, or the service interaction message carries the group identifier of the eNodeB. The device registration message may be an S1 setup message defined in a 3GPP standard, or a non-3GPP standard message: a private extended message. The configuration update message may be an eNodeB configuration update message defined in a 3GPP standard, or a non-3GPP standard message: a private extended message. The service interaction process may be a device service flow message or a user service flow message defined in a 3GPP standard, or a non-3GPP standard message: a private extended message. The eNodeB may also send the group identifier of the eNodeB to the MME by using another message, which is not limited in this embodiment of the present invention.

Generally, the group identifier of the eNodeB may reflect a related attribute of the eNodeB. For example, the group identifier may indicate an attribute of an area in which the eNodeB is located (for example, the attribute of the area in which the eNodeB is located is a common downtown area), an attribute of a network standard of the eNodeB (for example, the attribute of the network standard of the eNodeB is LTE-TDD), an attribute of a service area in which the eNodeB is located (for example, the attribute of the service area in which the eNodeB is located is a service area identifier of a cell corresponding to the eNodeB), an attribute of a radio access technology type of the eNodeB (for example, access technologies supported by the eNodeB are GSM, UMTS, and LTE access technologies), an attribute of an access frequency of the eNodeB (for example, the access frequency of the eNodeB is LTE 1900/2300/2600 MHz), a network element form attribute of the eNodeB (a scale of the eNodeB is a macro base station), a deployment form attribute of the eNodeB (for example, the eNodeB is a cloud base station from a perspective of a deployment characteristic), a network element service application attribute of the eNodeB (for example, the network element service application attribute of the eNodeB is a voice service), a network element home attribute of the eNodeB (for example, a home operator of the eNodeB is an operator A), or a network element performance attribute of the eNodeB. Therefore, the MME may group the eNodeB according to the related attribute that is of the eNodeB and that is indicated by the group identifier.

Optionally, the group identifier of the eNodeB may be at least one of an eNodeB ID, an eNodeB Name, an S1 link identifier of the eNodeB, an Internet Protocol (IP) address of the eNodeB, or an area attribute identifier of the eNodeB. The area attribute of the eNodeB may be an area attribute identifier that has been defined in a current standard, such as a tracking area identity (TAI) or an E-UTRAN cell global identifier (ECGI), or may be an area attribute identifier newly-defined in a later standard or in no standard.

Optionally, the group identifier of the eNodeB may be carried by using self-defined indication information, or may be carried in a manner of extending an information element that already exists in a protocol. For example, the group identifier of the eNodeB may be carried in a manner of extending the eNodeB name. Assuming that the eNodeB Name is a character string including four character substrings, the network element form attribute of the eNodeB may be added in a first character substring, and the network element home attribute of the eNodeB may be added in a second character substring, or vice versa. When the information element that already exists in a protocol is extended to carry the group identifier of the eNodeB, a length of the information element that already exists in a protocol and that carries the group identifier of the eNodeB may remain unchanged or may change, and all fields or some fields of an extended information element that already exists in a protocol are used to carry the group identifier of the eNodeB.

S202. The MME determines, according to a correspondence between the group identifier and the grouping rule, the group to which the eNodeB belongs.

The MME may determine the grouping rule according to the correspondence between the group identifier and the grouping rule, and further determine the group to which the eNodeB belongs. Specifically, the MME may match the group identifier in a prefix matching manner by using the grouping rule, so as to obtain the group to which the eNodeB belongs. For example, the group identifier is an eNodeB ID. The grouping rule may be: An eNodeB ID whose prefix is 1001 belongs to a Group_1, and an eNodeB ID whose prefix is 1010 belongs to a Group_2. If the group identifier of the eNodeB is an eNodeB ID (1010 0000 0000 0000 0001), the MME matches the eNodeB ID (1010 0000 0000 0000 0001) to the Group_2 by means of prefix matching, that is, the group to which the eNodeB belongs is the Group_2.

In another embodiment of the present invention, the MME may also match the group identifier in a wildcard matching manner by using the grouping rule, so as to obtain the group to which the eNodeB belongs. For example, the group identifier is an eNodeB Name. The grouping rule may be: An eNodeB Name of *maco* belongs to a common macro base station group Group_macro, an eNodeB Name of *pico* belongs to a pico base station group Group_pico, and an eNodeB Name of *home* belongs to a home eNodeB group Group_home. If the group identifier of the eNodeB is a character string representing an eNodeB name, and the character string includes a first, a second, . . . , and an $n^{th}$ character substring from left to right, and N is a positive integer, the first character substring represents a geographic location, for example, the first character substring is 0001, representing a district B of a city A, and other values represent other different geographic locations; and the second character substring represents a network element form, for example, the second character substring is 0001, representing pico, and other values represent other different network element forms. In another embodiment of the present invention, the first character substring may also represent a network element form, and the second character substring may also represent a geographic location, and no limitation is imposed on this in this embodiment of the present invention. Other character substrings are also used to represent other different group attributes. In a manner of wildcard matching, the character string representing the eNodeB name is matched to the Group_pico.

In another embodiment of the present invention, the MME may also match the group identifier in a section matching manner by using the grouping rule, so as to obtain the group to which the eNodeB belongs. For example, the group identifier is an eNodeB tracking area code (TAC). The grouping rule may be: An eNodeB TAC whose section is 0x0000 to 0x0099 belongs to a Group_1, and an eNodeB TAC whose section is 0x0100 to 0x0199 belongs to a Group_2, where 0x represents a hexadecimal number. In this embodiment of the present invention, a number in another number system may also be used to represent the eNodeB TAC. If the group identifier of the eNodeB is an eNodeB TAC (0x0101), the eNodeB TAC (0x0101) is matched to the Group_2 by means of section matching.

In another embodiment of the present invention, the MME may also match the group identifier in a mask matching manner by using the grouping rule, so as to obtain the group to which the eNodeB belongs. For example, the group identifier of the eNodeB is an eNodeB IP. The grouping rule may be: An eNodeB IP whose mask is 255.255.16.0 belongs to a Group_1, and an eNodeB IP whose mask is 255.255.32.0 belongs to a Group_2. If the group identifier of the eNodeB is an eNodeB IP (32.10.17.1), a mask of the IP is 255.255.16.0, and the eNodeB IP (32.10.17.1) is matched to the Group_1 by means of mask matching.

It should be noted that there may be multiple determined groups to which the eNodeB belongs. That is, when there are multiple grouping rules or there are multiple grouping policies in the grouping rule, the eNodeB may be grouped to multiple eNodeB groups. For example, the eNodeB is a macro base station, and an ID of the eNodeB is 1010 0000 0000 0000 0001. If the grouping rule is that an eNodeB ID whose prefix is 1001 belongs to a Group_1, and an eNodeB Name of *maco* belongs to a common macro base station group Group_macro, the group to which the eNodeB belongs may be the Group_1 and the Group_macro according to the grouping rule. Subsequently, operation and maintenance policies corresponding to the Group_1 and the Group_macro may be separately used. In addition, the eNodeB may also have multiple group identifiers, or the group identifier of the eNodeB may be used to indicate multiple attributes of the eNodeB. For example, the group identifiers of the eNodeB are an eNodeB Name and an eNodeB ID. Therefore, more factors may be considered during grouping.

For specific implementation manners of step S201 and step S202, refer to step S101 and step S102.

S203. The MME uses the operation and maintenance policy corresponding to the group to which the eNodeB belongs.

After determining the group to which the eNodeB belongs, the MME may use the operation and maintenance policy on all eNodeBs in the group to which the eNodeB belongs (that is, use the operation and maintenance policy on the group to which the eNodeB belongs). The operation and maintenance policy includes but is not limited to a performance indicator policy, a fault reporting policy, a signaling tracing policy, or a parameter configuration policy.

To make a person skilled in the art more clearly understand the technical solution provided in this embodiment of the present invention, the following uses examples for more detailed description.

(1) Scenario in which the Operation and Maintenance Policy is a Fault Reporting Policy The fault reporting policy may include a condition for reporting a link fault by group. For example, the fault reporting policy may be specifically: if a link fault in a to-be-reported group meets a preset condition, reporting alarm information used to indicate that a link fault occurs in the to-be-reported group.

In an LTE/EPC network architecture, the MME directly manages thousands of eNodeB network elements, that is, manages a large amount of S1 link information. Therefore, in a scenario in which a bearer network (for example, a packet transport network PTN) fails, there may be thousands of pieces of S1 link fault alarm information, and the MME generally reports the link alarm information in batches to an EMS/NMS. This imposes great signaling impact on a network, and greatly reduces efficiency of analyzing operation and maintenance data.

For the foregoing problem, if the method of steps S200 to S204 is used, S1 link alarming may be performed based on an eNodeB group, instead of being performed for a single eNodeB. In this case, the fault reporting policy may be specifically an S1 link fault reporting policy. Specifically, the MME may pre-configure a corresponding S1 link fault reporting policy for each eNodeB group, and in the configured S1 link fault reporting policy, it may be defined that if an S1 link fault in the eNodeB group meets a preset condition (for example, the preset condition may be: a ratio of a quantity of links with an S1 link fault in the eNodeB group to a total quantity of S1 links in the group exceeds a preset threshold), alarm information indicating that an S1 link fault occurs in the eNodeB group is sent to the EMS/NMS. Further, it may further be defined in the S1 link fault reporting policy that for an eNodeB group for which alarm information has been reported, if an S1 link fault occurs again subsequently, no new alarm information is reported. In the foregoing manner, S1 link alarming is performed based on an eNodeB group. This greatly reduces an amount of reported alarm information, reduces signaling impact on a network, and improves network operation and maintenance efficiency.

(2) Scenario in which the Operation and Maintenance Policy is a Performance Indicator Policy Performance indicator data collection is one of significant functions of network device performance management, and a basic procedure of the performance indicator data collection is: A measurement task is registered, and a network device collects a performance indicator of an object such as user equipment or an APN, generates a performance measurement result according to a measurement period, and then reports the performance measurement result to an EMS/NMS. By means of performance indicator measurement, security, a running status, a signal connection status, and usage of user resources and system resources of a network device may be measured and observed. The foregoing performance indicator may be information such as a quantity of S1-mode attach requests, a quantity of S1-mode attach successes, a quantity of S1-mode-specific bearer activation requests, a quantity of S1-mode-specific bearer activation successes, an S1-mode attach success rate, an average CPU usage rate, CPU overload duration, or a board memory usage rate. In an LTE/EPC network architecture, the MME and the EMS generally support thousands of eNodeB objects. In most performance indicator collections, data of eNodeBs in a specific area or eNodeBs of a specific type needs to be collected. Therefore, after a performance indicator is collected for a single eNodeB, combined analysis needs to be performed on the data. This affects operation and maintenance efficiency.

For the foregoing problem, the performance indicator policy in this embodiment of the present invention may be specifically a performance indicator collecting policy or a performance indicator reporting policy. The performance indicator collecting policy may be collecting a performance indicator by group, and the performance indicator reporting policy may be reporting a performance indicator by group. Alternatively, the performance indicator policy includes information about a to-be-reported performance indicator, so as to collect or report a performance indicator in a granularity of an eNodeB group, instead of collecting or reporting the performance indicator in a granularity of an eNodeB. This avoids integrated analysis or processing on data. For example, the MME may configure a grouping policy, or a performance indicator collecting policy or a performance indicator reporting policy on each eNodeB group according to a requirement, so that the MME can group eNodeBs in a specific area or eNodeBs of a specific type into a group according to the requirement, and further execute a corresponding performance indicator collecting policy or performance indicator reporting policy on the eNodeBs in the specific area or the eNodeBs of the specific type. This greatly improves network operation and maintenance efficiency. In addition, because performance indicators to which attention is paid for different types of eNodeBs may be different, the MME may further configure different performance indicators for different eNodeB groups according to a requirement.

In this embodiment of the present invention, an MME may receive a group identifier of an eNodeB that is sent by the eNodeB, determine, according to a correspondence between the group identifier and a grouping rule, a group to which the eNodeB belongs, and use an operation and maintenance policy on all network elements in the group to which the eNodeB belongs (that is, on the group to which the eNodeB belongs). This implements network operation and maintenance in a granularity of an eNodeB group, minimizes impact on operation and maintenance from eNodeB network planning and data adjustment, and greatly improves network operation and maintenance efficiency.

Figure 3:
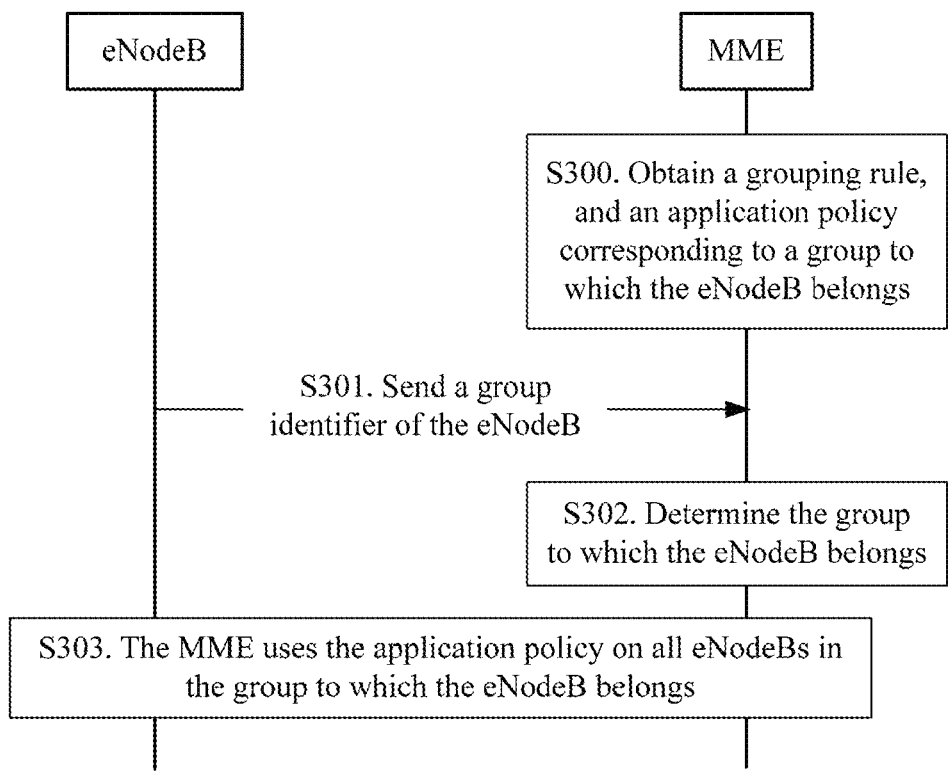
FIG. 3 is a flowchart of still another wireless communications system management method according to an embodiment of the present invention.

As shown in FIG. 3, an embodiment of the present invention provides a wireless communications system management method.

S300. An MME obtains a grouping rule, and an application policy corresponding to a group to which an eNodeB belongs.

S301. The eNodeB sends a group identifier of the eNodeB to the MME.

S302. The MME determines, according to a correspondence between the group identifier and the grouping rule, the group to which the eNodeB belongs.

For a specific implementation manner of steps S300 to S302, refer to steps S100 to S102, or refer to steps S200 to S202, and details are not described herein in this embodiment of the present invention.

S303. The MME executes the application policy corresponding to the group to which the eNodeB belongs.

After determining the group to which the eNodeB belongs, the MME may use the application policy on all eNodeBs in the group to which the eNodeB belongs.

The application policy includes but is not limited to one or more of the following policies: a data flow control policy, a device access policy, a network-side device weight information delivery policy, a resource allocation policy, or a functional characteristic deployment policy. To make a person skilled in the art more clearly understand the technical solution provided in this embodiment of the present invention, the following uses examples for more detailed description.

(1) The application policy is a data flow control policy. The MME may configure different data flow control policies for different eNodeB groups. The data flow control policy may include a condition for enabling a data flow control function, a priority of enabling a data flow control function, or indication information used to indicate whether to enable a data flow control function. For example, the data flow control policy includes information about the priority of enabling the data flow control function. A priority that is in the data flow control policy and that can be configured, by using the method in this embodiment of the present invention, for a datacard-dedicated network eNodeB group or an eNodeB group carrying no voice service is a high priority. When overload such as signaling exceeding a preset threshold, user data exceeding a preset threshold, or a CPU exceeding a preset threshold occurs in the MME, data flow control on the datacard-dedicated network eNodeB group or the NodeB group carrying no voice service is preferentially triggered (for example, overload signaling is delivered to an eNodeB in the eNodeB group, so that the eNodeB does not connect initially connected user equipment to the MME according to the Over Load signaling, and therefore overload of the MME is relieved; or the MME may directly discard a data packet, so as to reduce signaling impact). This implements preferential data flow control on an eNodeB group with a lower requirement on operator service experience and network reliability, thereby ensuring normal running of a key service.

For another example, the data flow control policy may be set as the following: When overload such as signaling overload, user data overload, or resource overload occurs in an eNodeB group, the data flow control function is enabled for the eNodeB group.

(2) The application policy is a device access policy. The device access policy may be access permission or access rejection. Therefore, by using the device access policy, the MME may reject or allow an eNodeB in the group to which the eNodeB belongs to get connected.

The eNodeB may actively connect to the MME by using an S1 SETUP process. However, during network deployment, the eNodeB frequently connects to an MME in another area because of an incorrect MME IP address configured in the eNodeB. Therefore, access control may be performed on the eNodeB by using the method in this embodiment of the present invention. Specifically, corresponding access policies may be configured for different groups. For example, if a corresponding access policy configured for a specific eNodeB group is access permission, when an eNodeB in the eNodeB group attempts to get connected, the MME may execute the access policy corresponding to the eNodeB group, that is, the access permission. Therefore, the eNodeB group is equivalent to a preset white list, and all eNodeBs in the eNodeB group are allowed to get connected. For another example, if a corresponding access policy configured for a specific eNodeB group is access prohibition, when an eNodeB in the eNodeB group attempts to get connected, the MME may execute the access policy corresponding to the eNodeB group, that is, the access prohibition. Therefore, the eNodeB group is equivalent to a black list, and all eNodeBs in the eNodeB group are prohibited to get connected. It can be learned that the MME may perform access control on the eNodeB by using the configured grouping rule and the configured access policy corresponding to the eNodeB group. For example, an MME in an area A allows an eNodeB only in the area A to get connected, and the MME in the area A prohibits an eNodeB away from the area A from getting connected. For another example, a dedicated network MME allows only a dedicated network eNodeB to get connected, and the MME prohibits a non-dedicated network eNodeB from getting connected.

(3) The application policy is a network-side device weight information delivery policy. The network-side device weight information delivery policy is delivering a network-side device weight. The network-side device weight information delivery policy includes information about a to-be-delivered network-side device weight, so that a specified network-side device weight may be delivered to a device such as a radio access network element. Therefore, the device such as the radio access network element may perform a load balancing policy on a connected user according to the weight information, or perform operation and maintenance (for example, prohibiting or allowing access of user equipment).

For example, because an MME is generally in a pool networking form, in a scenario such as capacity expansion or splitting of an MME POOL, for example, a first MME needs to migrate users of some eNodeB groups to another MME (that is, a second MME), information indicating that a device weight of the first MME is 0 generally needs to be delivered to the eNodeB before migration. That the device weight of the first MME is 0 means that newly connected user equipment is prohibited from connecting to the first MME, and that the device weight of the first MME is 1 means that the newly connected user equipment is connected to the first MME according to the weight, or vice versa. Therefore, when migration needs to be performed, the first MME may execute a network-side device weight information delivery policy corresponding to an eNodeB group in which a user needs to be migrated. The network-side device weight information delivery policy may be configured as: delivering the device weight 0 of the first MME. Therefore, the first MEE may deliver the device weight 0 of the first MME to an eNodeB in the eNodeB group in which a user needs to be migrated, so that the eNodeB in the eNodeB group in which a user needs to be migrated prohibits the newly connected user equipment from connecting to the first MME. Therefore, the migration may be started.

(4) The application policy is a resource allocation policy. The resource allocation policy includes information about a to-be-allocated link parameter (such as information about a receive/transmit cache of a Stream Control Transmission Protocol (SCTP) link of an S1 interface), information about a hardware resource (such as information about a board, a memory, a CPU, or a physical port), or information about a software resource (such as information about a process, a thread, a link number, a logical port, or a local IP address). Therefore, the MME may allocate, by using the resource allocation policy, a corresponding resource to an eNodeB in the group to which the eNodeB belongs.

For example, in an LTE/EPC network, an MME manages many eNodeBs, and an eNodeB link occupies increasingly more memory resources. Because an eNodeB has various forms, specifications of users or links carried by different types of eNodeBs are different. For example, a macro eNodeB generally supports a commercial specification greater than 1000 online user connections, while a pico eNodeB generally supports a commercial specification less than 100 online user connections. Therefore, different types of eNodeBs have different requirements on an MME S1 link memory resource. Therefore, the resource allocation policy may specifically include a size of a to-be-allocated receive/transmit cache area of the SCTP link of the S1 interface. The MME may group different types of eNodeBs according to a requirement, and configure different resource allocation policies for different eNodeB groups. For example, a resource allocation policy configured for a pico eNodeB group may be: allocating a receive/transmit cache of 1 MB to the SCTP link of the S1 interface; a resource allocation policy configured for a macro eNodeB group may be: allocating a receive/transmit cache of 200 MB to the SCTP link of the S1 interface. Therefore, resource usage of the MME is greatly improved.

(5) The application policy is a functional characteristic deployment policy. The functional characteristic deployment policy may include indication information used to instruct to enable or disable a specific/some functions, or may include information needed for using a specific/some functions, or a processing manner corresponding to use of a function, thereby implementing function control. For example, in an LTE/EPC network, eNodeBs or MMEs from multiple manufacturers are generally used, and therefore, there may be a crossed interconnection problem between manufacturers of eNodeBs and MMEs. For example, an MME may need to interconnect with an eNodeB from a manufacturer A and an eNodeB from a manufacturer B, but the eNodeB from the manufacturer A and the eNodeB from the manufacturer B may have different functions. Therefore, the MME needs to be compatible with the two eNodeBs with different functions. To resolve the foregoing problem, according to the method in this embodiment of the present invention, the grouping rule is configured, so that eNodeBs from the manufacturer A are grouped to a Group A, eNodeBs from the manufacturer B are grouped to a Group B, and different functional characteristic deployment policies are configured for the Group A and the Group B. Therefore, the MME may process the eNodeBs from the manufacturer A by using a function corresponding to the eNodeBs from the manufacturer A, and process the eNodeBs from the manufacturer B by using a function corresponding to the eNodeBs from the manufacturer B, thereby implementing function control on different types of eNodeB groups.

The foregoing manner may also be used in another scenario. For example, when a new function/characteristic is being deployed, different functional characteristic deployment policies may be configured for different eNodeB groups to implement function deployment control on different eNodeB groups. For example, a voice over LTE (VoLTE) function is enabled in a specified eNodeB group. For another example, some functions may greatly affect network performance when enabled in an entire network, and therefore, some functions may be enabled only for eNodeBs in a specified area or of a specific type (that is, a specific/some eNodeB groups). For example, a location reporting function is enabled only for an eNodeB group in a specific area, so as to reduce impact on network performance.

In this embodiment of the present invention, an MME may receive a group identifier of an eNodeB that is sent by the eNodeB, determine, according to a correspondence between the group identifier and a grouping rule, a group to which the eNodeB belongs, and use an application policy on all network elements in the group to which the eNodeB belongs (that is, on the group to which the eNodeB belongs). The application policy includes but is not limited to a data flow control policy, a device access policy, a network-side device weight information delivery policy, a resource allocation policy, or a functional characteristic deployment policy. This implements management in a granularity of an eNodeB group, and effectively improves efficiency in aspects such as network optimization, function deployment, and resource optimization.

Figure 4:
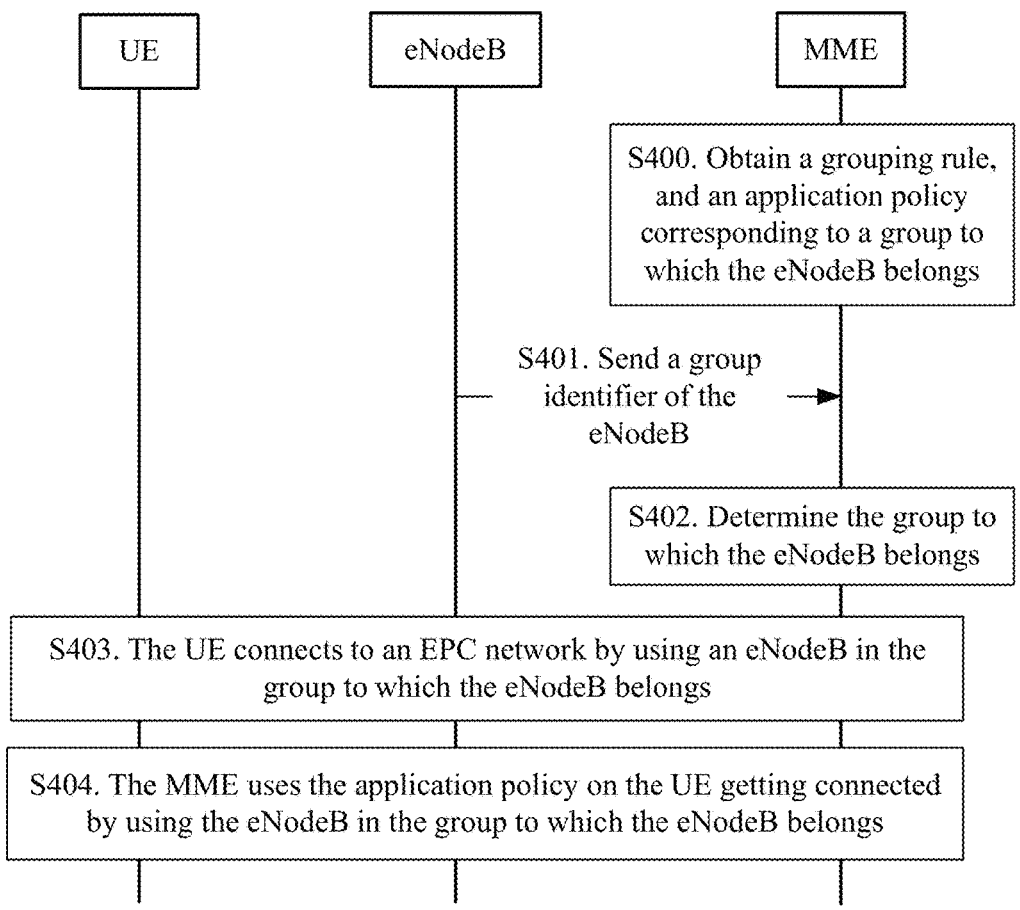
FIG. 4 is a flowchart of yet another wireless communications system management method according to an embodiment of the present invention.

As shown in FIG. 4, an embodiment of the present invention provides a wireless communications system management method.

S400. An MME obtains a grouping rule, and an application policy corresponding to a group to which an eNodeB belongs.

S401. The eNodeB sends a group identifier of the eNodeB to the MME.

S402. The MME determines, according to a correspondence between the group identifier and the grouping rule, the group to which the eNodeB belongs.

For a specific implementation manner of steps S400 to S402, refer to steps S100 to S103, or refer to steps S200 to S202, and details are not described herein in this embodiment of the present invention.

S403. User equipment connects to an EPC network by using an eNodeB in the group to which the eNodeB belongs.

S404. The MME uses the application policy corresponding to the group to which the eNodeB belongs.

The MME may use the application policy on the user equipment getting connected by using the eNodeB in the group to which the eNodeB belongs.

The application policy includes but is not limited to one or more of the following policies: a paging policy, a tracking area identity list (TAList) allocation policy, a user equipment identity allocation policy, an access point name (APN) allocation policy, a quality of service (QoS) allocation policy, a policy for delivering a Subscriber Profile ID for RAT/Frequency Selection Priority (SPID), an area handover restriction policy, a voice policy, a user location reporting policy, an SGW/PGW selection policy, or a user authentication policy. The RAT, that is, a radio access technology, represents a network standard. To make a person skilled in the art more clearly understand the technical solution provided in this embodiment of the present invention, the following uses examples for more detailed description.

(1) The application policy is a paging policy. The paging policy may include information about a quantity of paging retransmission times, information about paging wait duration, or indication information used to indicate whether to enable accurate paging. The accurate paging is a technology in which user equipment preferentially pages one or some eNodeBs in a paging area during paging, and after the paging fails, an eNodeB paging range is gradually expanded until paging is performed on all eNodeBs in the paging area.

For example, a grouping rule and a corresponding paging policy are configured, so that the MME may use accurate paging on user equipment getting connected by using an eNodeB in a first area (for example, an industrial area), and use whole area paging on user equipment getting connected by using an eNodeB in a second area (for example, an express traffic area) when paging the user equipment. For another example, a grouping rule and a corresponding paging policy are configured, so that the MME may use global paging on user equipment getting connected by using a pico eNodeB, and use accurate paging on user equipment getting connected by using a macro eNodeB. Therefore, the MME may configure different paging policies according to a form type or an area type of an eNodeB.

(2) The application policy is a TAList allocation policy. For example, a grouping rule and a TAList allocation policy are configured, so that the MME may allocate a TAList formed by a dedicated TAI to user equipment connected to a high-speed railway dedicated network eNodeB.

(3) The application policy is a user equipment identity allocation policy. The user equipment identity allocation policy may include information about the allocated user equipment identity. The user equipment identity includes but is not limited to a globally unique temporary identity (GUTI), a mobility management entity code (MMEC), a mobility management entity group identifier (MMEGI), or a public land mobile network (PLMN), so as to implement user routing or user context positioning. For example, the user equipment identity allocation policy is an MMEC allocation policy. A grouping rule and a corresponding MMEC allocation policy are configured, so that the MME uses an MMEC allocation policy corresponding to the group to which the eNodeB belongs on the user equipment. That is, the MME may allocate a corresponding MMEC to user equipment getting connected by using an eNodeB group in an operation and maintenance area. Therefore, by using the MMEC, the MME may determine the user equipment getting connected by using the eNodeB group in the operation and maintenance area, thereby implementing user routing management.

(4) The application policy is an APN allocation policy. The APN allocation policy may include information about a to-be-allocated APN. For example, a grouping rule and an APN allocation policy are configured, so that the MME may allocate a corresponding APN to user equipment getting connected by using an eNodeB group such as a pico eNodeB group, a home eNodeB group, or an eNodeB group in a free service pilot area, so as to perform a data service or a voice service.

(5) The application policy may be a QoS allocation policy. The QoS allocation policy may include information about a to-be-allocated QoS parameter. A grouping rule and a QoS allocation policy are configured, so that the MME may deliver QoS of superior/higher quality to a VIP user getting connected by using a specified eNodeB group (for example, an eNodeB in a place such as an airport/conference site/stadium).

(6) The application policy may be an SPID delivery policy. The SPID delivery policy includes information about a to-be-delivered SPID. For example, a grouping rule and an SPID policy are configured, so that the MME may use, in a process such as attach/handover/location update of user equipment getting connected by using a specified eNodeB group, an SPID delivery policy corresponding to the group to which the eNodeB belongs on the user equipment, that is, deliver a specified SPID to an eNodeB to which the user equipment is connected. Therefore, the eNodeB may control a behavior of the user equipment according to the SPID (for example, specify a priority of user equipment camping and frequency band switching).

(7) The application policy is an area handover restriction policy. The area handover restriction policy may include an area handover restriction list (handover restriction list). The area handover restriction list is used to prevent user equipment from being handed over to a specific restricted area. For details of the area handover restriction list, refer to a 3GPP standard. For example, a grouping rule and an area handover restriction policy are configured, so that the MME may use, in a process such as attach/handover/location update of user equipment getting connected by using an eNodeB in a specified eNodeB group (for example, in a hotspot area or a service experience area), an area handover restriction policy corresponding to the group to which the eNodeB belongs on the user equipment, that is, deliver the area handover restriction policy to the eNodeB. Therefore, the eNodeB may restrict, according to the area handover restriction policy, an area to which the user equipment is to be handed over.

(8) The application policy may be a voice policy. For example, the voice policy may include information about a CS registration area (LAI) or information about a voice policy priority, or the voice policy may be using which technology to implement a voice service. For example, a grouping rule and a voice policy are configured, so that a voice policy that is configured by the MME for an eNodeB group of TDD may be: preferentially using a Circuit Switched Fallback (CSFB) technology, and a voice policy that is configured for an eNodeB group of frequency division duplex FDD may be: preferentially using VoLTE.

(9) The application policy is a user location reporting policy. The user location reporting policy may be enabling or disabling a user location reporting function. Different user location reporting policies may be configured for different eNodeB groups. For example, a user location reporting policy configured for an eNodeB group in a special monitor area or an eNodeB group in a special service area may be: enabling a user location reporting function.

(10) The application policy may be an SGW/PGW selection policy. A specific SGW/PGW may be selected by using the SGW/PGW selection policy. The SGW/PGW selection policy may include an IP address or a domain name of the SGW/PGW, or include a TAI or an APN that is used to determine the SGW/PGW, or include information used to determine a TAI/APN, where the TAI/APN is used to determine the SGW/PGW. For example, for user equipment getting connected by using an eNodeB group in a specific area, an SGW/PGW in the area is selected, so as to implement deployment of a regional service. In addition, because a grouping technology is used, an amount of data that needs to be configured during SGW/PGW selection is reduced.

(11) The application policy may be a user authentication policy. Recognition and authentication of a user identity, and key synchronization may be implemented by means of user authentication, and validity of the user identity may be determined, so that an authorized user can use a service provided by a network. The authentication policy may include a user authentication frequency, a user authentication trigger condition, or the like. Different user authentication policies may be configured for different eNodeB groups. For example, a stricter user authentication policy may be configured for an eNodeB group in an area with a higher secure access requirement. Therefore, after user equipment connects to an EPC network by using an eNodeB in a specific eNodeB group, the MME may execute a user authentication policy corresponding to the group on the user equipment.

In this embodiment of the present invention, an MME may receive a group identifier of an eNodeB that is sent by the eNodeB, determine, according to a correspondence between the group identifier and a grouping rule, a group to which the eNodeB belongs, and use an application policy on user equipment getting connected by using an eNodeB in the group to which the eNodeB belongs. The application policy includes but is not limed to a paging policy, a TAList allocation policy, a user equipment identity allocation policy, an APN allocation policy, a QoS allocation policy, an SPID delivery policy, an area handover restriction policy, a voice policy, a user location reporting policy, an SGW/PGW selection policy, or a user authentication policy. This implements management in a granularity of an eNodeB group, and effectively improves efficiency in aspects such as network operation and maintenance, network optimization, function deployment, and resource optimization.

Figure 5:
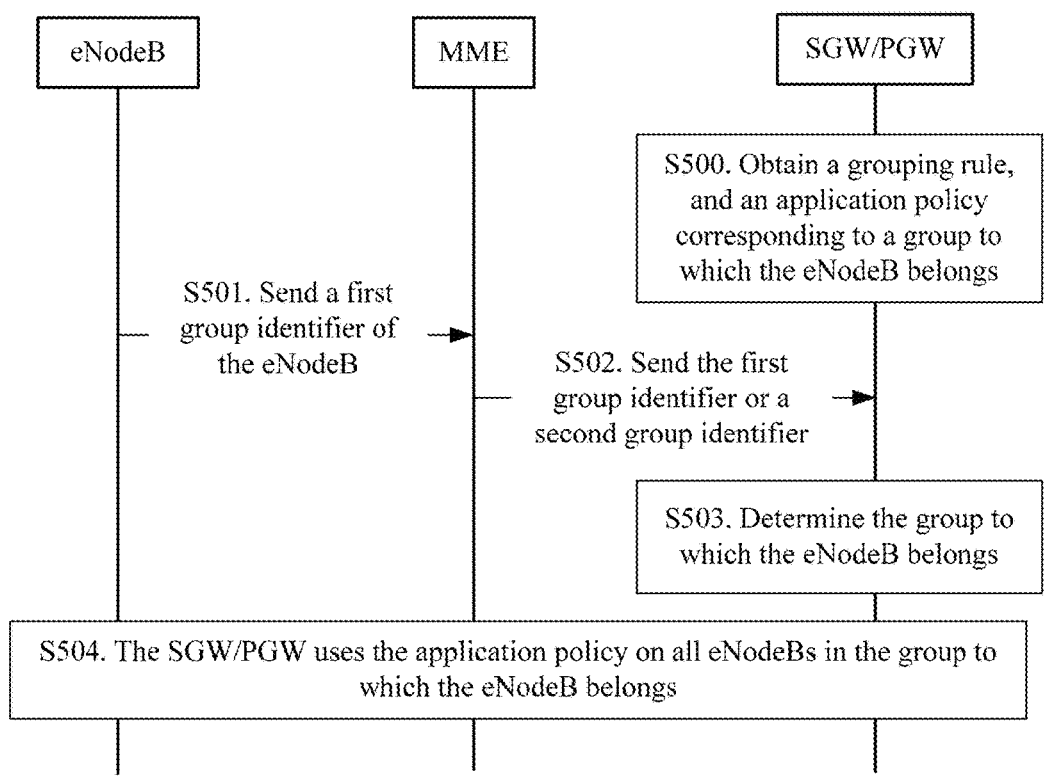
FIG. 5 is a flowchart of still yet another wireless communications system management method according to an embodiment of the present invention.

As shown in FIG. 5, an embodiment of the present invention provides a wireless communications system management method.

S500. An SGW/PGW obtains a grouping rule, and an application policy corresponding to a group to which an eNodeB belongs.

S501. The eNodeB sends a first group identifier of the eNodeB to the MME.

It should be noted that the first group identifier is equivalent to the group identifier in the method embodiments of FIG. 1 to FIG. 4, and is used to indicate a related attribute of the eNodeB. "First", "second", and the like in embodiments of the present invention are merely used to differentiate different indication information, messages, or other objects, rather than representing a sequence relationship. Therefore, for a specific implementation manner of steps S600 and S601, refer to steps S100 and S101 or steps S200 and S201, and details are not described herein in this embodiment of the present invention.

S502. The MME sends the first group identifier to the SGW/PGW; or the MME obtains a second group identifier by processing the first group identifier, and sends the second group identifier to the SGW/PGW.

In some cases, because the SGW/PGW cannot identify or sense the first group identifier, or due to a cause such as consideration of a communication identifier protocol, the MME cannot directly send the first group identifier to the SGW/PGW. In this case, the MME may perform processing such as filtering, mapping, or protocol conversion on the first group identifier to obtain the second group identifier, and send the second group identifier to the SGW/PGW.

S503. The SGW/PGW determines, according to a correspondence between the first group identifier and the grouping rule or a correspondence between the second group identifier and the grouping rule, the group to which the eNodeB belongs.

For a specific implementation manner of step S503, refer to step S102 or step S202, and details are not described herein in this embodiment of the present invention.

S604. The SGW/PGW executes the application policy corresponding to the group to which the eNodeB belongs.

After determining the group to which the eNodeB belongs, the SGW/PGW may use the application policy on all eNodeBs in the group to which the eNodeB belongs (that is, use the application policy on the group to which the eNodeB belongs), or may use the application policy on user equipment getting connected by using an eNodeB in the group to which the eNodeB belongs.

The application policy may be a data flow control policy or a resource allocation policy. For details of the data flow control policy and the resource allocation policy, refer to step S303, and details are not described herein in this embodiment of the present invention.

The application policy may be a charging policy. For example, the charging policy may be enabling a charging function or disabling a charging function. For another example, the charging policy may be used to indicate an object (such as traffic or an application) on which charging is to be performed. For another example, the charging policy may be used to indicate a specific charging rule, thereby implementing different charging or free charging on an eNodeB group.

Optionally, the application policy in this embodiment of the present invention may be replaced with an operation and maintenance policy. Therefore, after determining the group to which the eNodeB belongs, the SGW/PGW may use the operation and maintenance policy on an eNodeB in the group to which the eNodeB belongs, or may use the operation and maintenance policy on the group to which the eNodeB belongs. For details of the operation and maintenance policy, refer to step S203, and details are not described herein in this embodiment of the present invention.

In this embodiment of the present invention, an SGW/PGW may obtain a first group identifier or a second group identifier of an eNodeB, determine, according to the first group identifier or the second group identifier, and a grouping rule, a group to which the eNodeB belongs, and use an application policy or an operation and maintenance policy on all network elements in the group to which the eNodeB belongs. The application policy includes but is not limited to a data flow control policy, a resource allocation policy, or a charging policy. This implements management in a granularity of an eNodeB group, and effectively improves efficiency in aspects such as network operation and maintenance, network optimization, function deployment, and resource optimization.

Figure 6:
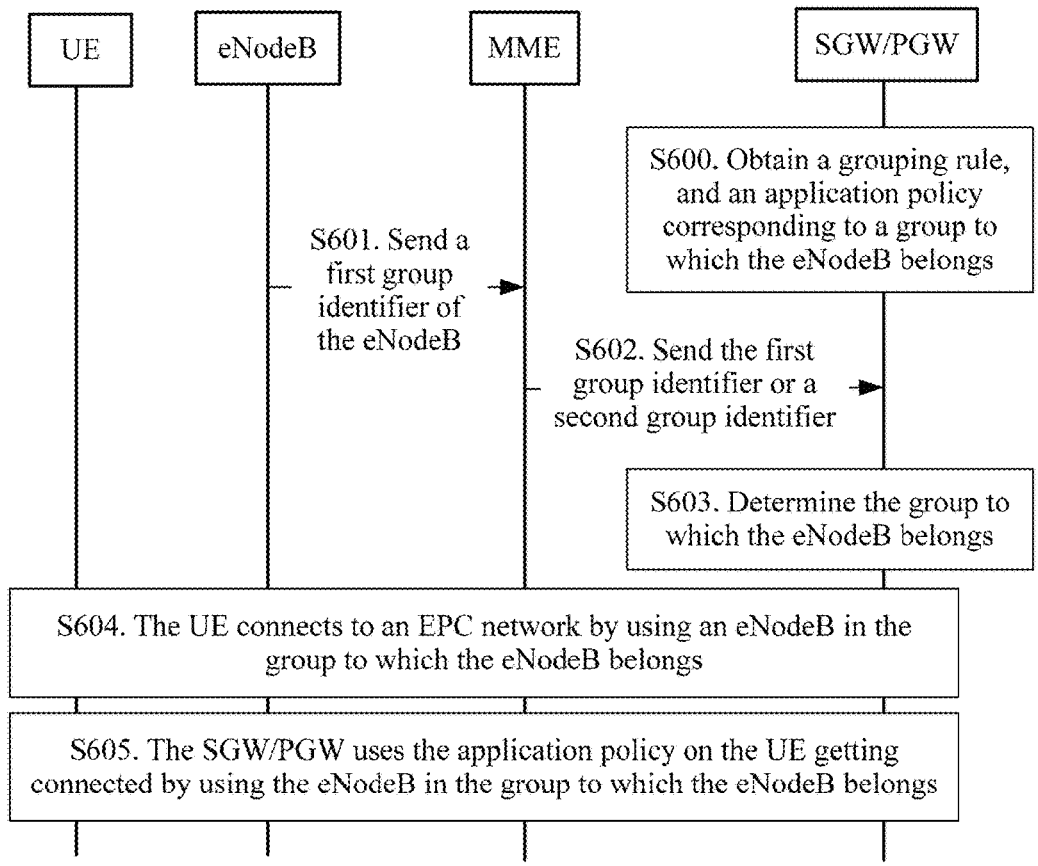
FIG. 6 is a flowchart of a further wireless communications system management method according to an embodiment of the present invention.

As shown in FIG. 6, an embodiment of the present invention provides a wireless communications system management method.

S600. An SGW/PGW obtains a grouping rule, and an application policy corresponding to a group to which an eNodeB belongs.

S601. The eNodeB sends a first group identifier of the eNodeB to the MME.

S602. The MME sends the first group identifier to the SGW/PGW; or the MME obtains a second group identifier by processing the first group identifier, and sends the second group identifier to the SGW/PGW.

S603. The SGW/PGW determines, according to a correspondence between the first group identifier and the grouping rule or a correspondence between the second group identifier and the grouping rule, the group to which the eNodeB belongs.

For a specific implementation manner of steps S600 to S604, refer to steps S500 to S504, and details are not described herein in this embodiment of the present invention.

S604. User equipment connects to an EPC network by using an eNodeB in the group to which the eNodeB belongs.

S605. The SGW/PGW executes the application policy corresponding to the group to which the eNodeB belongs on the user equipment.

The SGW/PGW may use the application policy corresponding to the group to which the eNodeB belongs on the user equipment getting connected by using the eNodeB in the group to which the eNodeB belongs.

The application policy may be a charging policy. For details of the charging policy, refer to step S504, and details are not described herein in this embodiment of the present invention.

The application policy may be an APN allocation policy, a QoS allocation policy, or a user location reporting policy. For details of the APN allocation policy, the QoS allocation policy, and the user location reporting policy, refer to step S404, and details are not described herein in this embodiment of the present invention.

The application policy may be a service authentication policy. Legality and validity of using a service by a user may be determined by means of service authentication, so that a user can use a service only within a scope authorized by a network or an operator. The authentication policy may include a service authentication frequency, a service authentication trigger condition, or the like. Different service authentication policies may be configured for different eNodeB groups.

In this embodiment of the present invention, an SGW/PGW may obtain a first group identifier or a second group identifier of an eNodeB, determine, according to the first group identifier or the second group identifier, and a grouping rule, a group to which the eNodeB belongs, and use an application policy on user equipment getting connected by using an eNodeB in the group to which the eNodeB belongs. The application policy includes but is not limited to an APN allocation policy, a QoS allocation policy, a user location reporting policy, or a service authentication policy. This implements management in a granularity of an eNodeB group, and effectively improves efficiency in aspects such as network operation and maintenance, network optimization, function deployment, and resource optimization.

Figure 7:
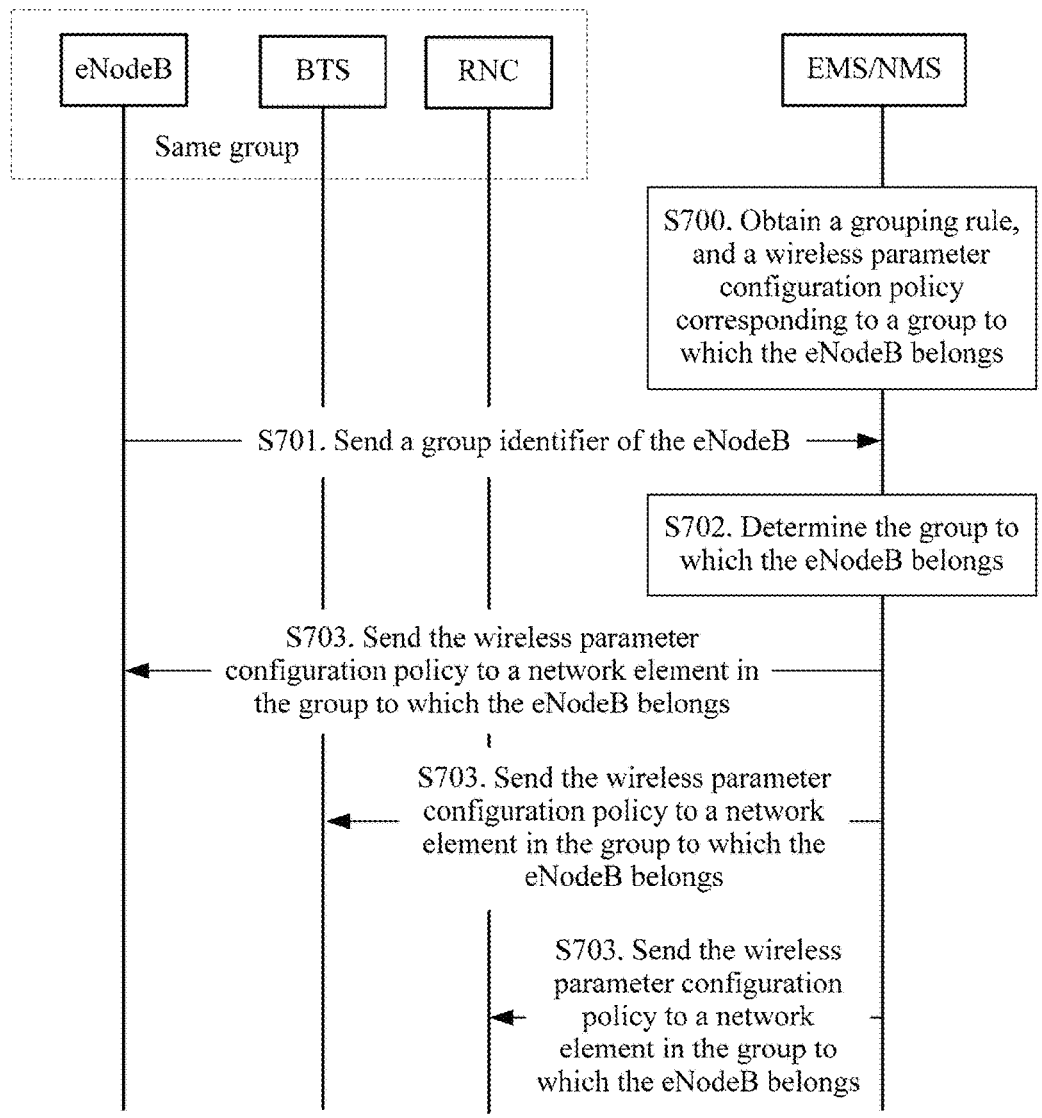
FIG. 7 is a flowchart of a still further wireless communications system management method according to an embodiment of the present invention.

As shown in FIG. 7, an embodiment of the present invention provides a wireless communications system management method.

S700. An EMS/NMS obtains a grouping rule, and a wireless parameter configuration policy corresponding to a group to which an eNodeB belongs.

S701. The eNodeB sends a group identifier of the eNodeB to the EMS/NMS.

S702. The EMS/NMS determines, according to a correspondence between the group identifier and the grouping rule, the group to which the eNodeB belongs.

For a specific implementation manner of steps S700 to S702, refer to steps S100 to S103, or refer to steps S200 to S202, and details are not described herein in this embodiment of the present invention.

S703. The EMS/NMS sends the wireless parameter configuration policy corresponding to the group to which the eNodeB belongs to all network elements in the group to which the eNodeB belongs.

The wireless parameter configuration policy includes configuration data for a user network camping priority, configuration data for power control, configuration data for user connection management, configuration data for wireless coverage, or configuration data for cell management.

It should be noted that a network element in the group to which the eNodeB belongs may be an eNodeB, or may be a network element other than an eNodeB, such as a BTS or an RNC. That is, different types of radio access network elements may be grouped into one group during grouping according to the grouping rule. As shown in FIG. 7, when a BTS, an RNC, and the eNodeB belong to a same group, the EMS/NMS may send the wireless parameter configuration policy to the eNodeB, the BTS, and the RNC when executing S703.

Likewise, an eNodeB in a group to which the eNodeB belongs in the embodiments of FIG. 2 to FIG. 6 may be replaced with a network element in the group to which the eNodeB belongs. The network element is not limited to an eNodeB, and may also be another radio access network element, which is not listed one by one in this embodiment of the present invention.

In this embodiment of the present invention, an EMS/NMS may receive a group identifier of an eNodeB that is sent by the eNodeB, determine, according to a correspondence between the group identifier and a grouping rule, a group to which the eNodeB belongs, and send a wireless parameter configuration policy corresponding to the group to which the eNodeB belongs to all network elements in the group to which the eNodeB belongs, thereby implementing network operation and maintenance in a granularity of an eNodeB group, and effectively improving efficiency of network configuration.

Figure 8:
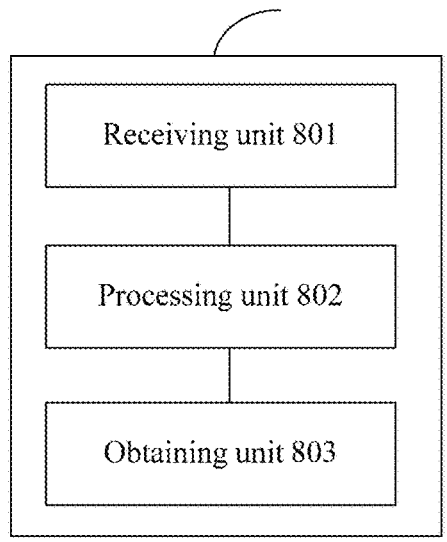
FIG. 8 is a schematic diagram of a radio access network element management device according to an embodiment of the present invention.

As shown in FIG. 8, an embodiment of the present invention provides a radio access network element management device 80. The radio access network element management device 80 may be an MME, an SGW, a PGW, an EMS, or an NMS of an LTE network, or may be a radio network controller RNC or a BSC of a 2G or 3G network, or may be a next-generation (such as 4.5G or 5G) network element, or may be a network element of another future network standard. The radio access network element management device 80 includes a receiving unit 801 and a processing unit 802. The receiving unit 801 is configured to obtain a group identifier of a radio access network element.

The processing unit 802 is configured to determine, according to a correspondence between a grouping rule and the group identifier, a group to which the radio access network element belongs; and use a processing policy corresponding to the group to which the radio access network element belongs. The group identifier is used to indicate at least one attribute of an attribute of an area in which the radio access network element is located, an attribute of a network standard of the radio access network element, an attribute of a service area in which the radio access network element is located, an attribute of a radio access technology type of the radio access network element, an attribute of an access frequency of the radio access network element, a network element form attribute of the radio access network element, a deployment form attribute of the radio access network element, a network element home attribute of the radio access network element, a network element service application attribute of the radio access network element, or a network element performance attribute of the radio access network element.

Optionally, the group identifier may be a character or a character string indicating at least one of the foregoing attributes. For example, the group identifier may be a character string 0010, where 00 is used to indicate that the attribute of the network standard of the radio access network element is the LTE-FDD, and 10 is used to indicate that the attribute of the area in which the radio access network element is located is a commercial district. For another example, the group identifier may be at least one of an identity of the radio access network element, a name of the radio access network element, a link identifier of the radio access network element, an IP address of the radio access network element, or an area attribute identifier of the radio access network element.

Optionally, the receiving unit 801 is specifically configured to: receive the group identifier that is sent by the radio access network element when the radio access network element is connected to the radio access network element management device; or receive the group identifier that is sent by the radio access network element when the radio access network element restarts; or receive the group identifier that is sent by the radio access network element when configuration in the radio access network element is updated; or receive the group identifier that is sent by the radio access network element when the group identifier is updated.

Optionally, the processing unit 802 is specifically configured to use the processing policy on all radio access network elements in the group to which the radio access network element belongs; or use the processing policy on user equipment getting connected by using a radio access network element in the group to which the radio access network element belongs.

Optionally, the radio access network element management device further includes:

an obtaining unit 803, configured to obtain the grouping rule pre-configured in the radio access network element management device; or obtain the processing policy that is pre-configured in the radio access network element management device and that is corresponding to the group to which the radio access network element belongs; or receive the grouping rule that is sent by a network management system NMS/element management system EMS; or receive the processing policy that is sent by an NMS or an EMS and that is corresponding to the group to which the radio access network element belongs.

Optionally, the processing policy is an operation and maintenance policy. The operation and maintenance policy includes at least one of a performance indicator policy, a fault reporting policy, a signaling tracing policy, or a parameter configuration policy. For example, the fault reporting policy is: if a link fault in a to-be-reported group meets a preset condition, reporting alarm information used to indicate that a link fault occurs in the to-be-reported group; or the performance indicator policy is reporting a performance indicator by group; or the performance indicator policy includes information about a to-be-reported performance indicator.

Optionally, the processing policy is an application policy. The application policy includes at least one of a data flow control policy, a device access policy, a network-side device weight information delivery policy, a resource allocation policy, a functional characteristic deployment policy, or a charging policy. For example, the data flow control policy includes a condition for enabling a data flow control function, a priority of enabling a data flow control function, or indication information used to indicate whether to enable a data flow control function; or the resource allocation policy includes information about a to-be-allocated link parameter, information about a hardware resource, or information about a software resource, where the information about the link parameter includes information about a receive/transmit cache of a Stream Control Transmission Protocol SCTP link of an S1 interface; the information about the hardware resource includes information about a board, a memory, a CPU, or a physical port; and the information about the software resource includes information about a process, a thread, a link number, a logical port, or a local IP address.

Optionally, the processing policy is an application policy. The application policy includes at least one of a paging policy, a TAList allocation policy, a user equipment identity allocation policy, an APN allocation policy, a QoS allocation policy, an SPID delivery policy, an area handover restriction policy, a voice policy, a user location reporting policy, an SGW/packet data network gateway PGW selection policy, or a user authentication policy. The user equipment identity includes but is not limited to a GUTI, an MMEC, an MMEGI, or a PLMN. For example, the paging policy includes information about a quantity of paging retransmission times, information about paging wait duration, or indication information used to indicate whether to enable accurate paging; or the SPID delivery policy includes information about a to-be-delivered SPID; or the area handover restriction policy includes a handover restriction list; or the SGW/PGW selection policy includes an IP address or a domain name of an SGW/PGW, or includes a tracking area identity TAI or an APN for determining an SGW/PGW, or includes information for determining a TAI/APN, where the TAI/APN is used to determine an SGW/PGW.

Optionally, the processing policy is a wireless parameter configuration policy. The wireless parameter configuration policy includes configuration data for a user network camping priority, configuration data for power control, configuration data for user connection management, configuration data for wireless coverage, or configuration data for cell management.

For a specific implementation manner of this embodiment of the present invention, refer to any method embodiment of FIG. 1 to FIG. 7, and details are not described herein in this embodiment of the present invention.

In this embodiment of the present invention, a receiving unit 801 may obtain a group identifier of a radio access network element, and a processing unit 802 may determine, according to a correspondence between a grouping rule and the group identifier, a group to which the radio access network element belongs, and use a same processing policy on the group to which the radio access network element belongs or user equipment getting connected to a network by using the radio access network element, and may apply different processing policies to different groups. The processing policy may be specifically an operation and maintenance policy, an application policy, or a wireless parameter configuration policy. This effectively improves efficiency in aspects such as network operation and maintenance, wireless parameter configuration, network optimization, and function deployment.

A person skilled in the art can understand that the receiving unit or the obtaining unit configured to receive a message in the embodiment of FIG. 8 may be implemented by using a receiver, or by using a transceiver. In physical implementation, the receiver or the transceiver may be implemented by one physical entity or by multiple physical entities, and a transmitter and the transceiver may be implemented by one physical entity or by multiple physical entities, which is not limited in the present invention. Another unit such as the processing unit may be implemented by one or more processors, which is not limited in the present invention.

Figure 9:
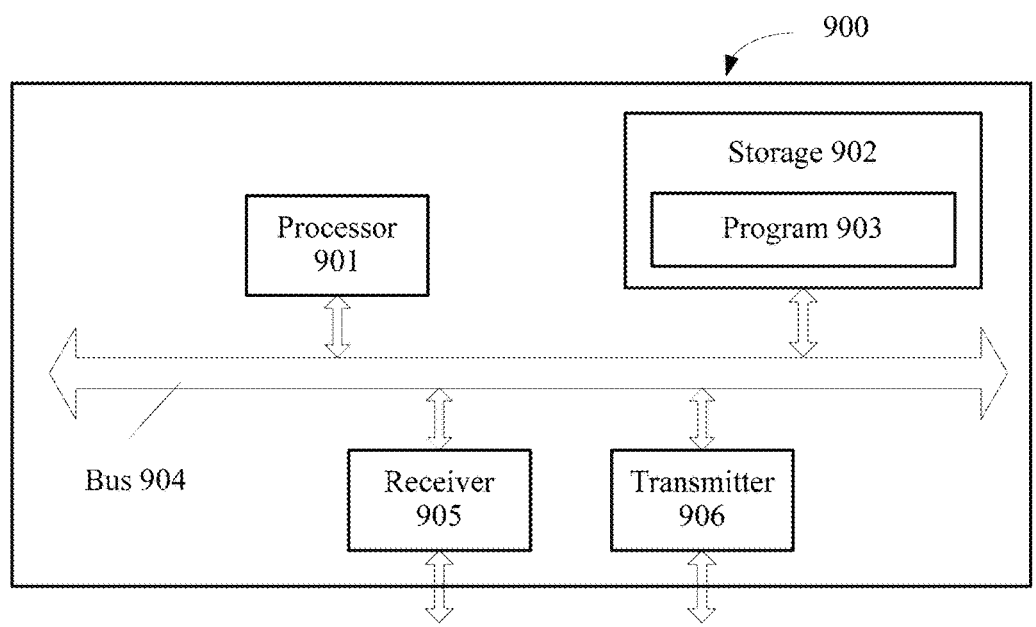
FIG. 9 is a schematic diagram of a compositional structure of another radio access network element management device according to an embodiment of the present invention.

As shown in FIG. 9, an embodiment of the present invention provides a radio access network element management device. The radio access network element management device may include:

a processor 901, a storage 902, a bus 904, a receiver 905, and a transmitter 906. The processor 901, the storage 902, the receiver 905, and the transmitter 906 are connected and complete mutual communication by using the bus 904.

The processor 901 may be a single-core or multi-core central processing unit, or an application-specific integrated circuit, or is configured as one or more integrated circuits that implement this embodiment of the present invention.

The storage 902 may be a high-speed RAM, or may be a non-volatile memory, such as at least one magnetic disk storage.

The storage 902 is configured to store a computer-executable instruction 903. Specifically, the computer-executable instruction 903 may include program code. The computer-executable instruction is configured to be executed by the processor.

The receiver is configured to obtain a group identifier of a radio access network element.

The processor is configured to determine, according to a correspondence between a grouping rule and the group identifier, a group to which the radio access network element belongs; and use a processing policy corresponding to the group to which the radio access network element belongs.

The group identifier is used to indicate at least one attribute of an attribute of an area in which the radio access network element is located, an attribute of a network standard of the radio access network element, an attribute of a radio access technology type of the radio access network element, an attribute of an access frequency of the radio access network element, a network element form attribute of the radio access network element, a deployment form attribute of the radio access network element, a network element home attribute of the radio access network element, a network element service application attribute of the radio access network element, or a network element performance attribute of the radio access network element.

Optionally, the receiver is specifically configured to: receive the group identifier that is sent by the radio access network element when the radio access network element is connected to the radio access network element management device; or receive the group identifier that is sent by the radio access network element when the radio access network element restarts; or receive the group identifier that is sent by the radio access network element when configuration in the radio access network element is updated; or receive the group identifier that is sent by the radio access network element when the group identifier is updated.

Optionally, the processor is specifically configured to use the processing policy on all radio access network elements in the group to which the radio access network element belongs; or use the processing policy on user equipment getting connected by using a radio access network element in the group to which the radio access network element belongs.

Optionally, the processor is further configured to obtain the grouping rule pre-configured in the radio access network element management device; or obtain the processing policy that is pre-configured in the radio access network element management device and that is corresponding to the group to which the radio access network element belongs; or the receiver is further configured to receive the grouping rule that is sent by a network management system NMS or an element management system EMS; or receive the processing policy that is sent by an NMS or an EMS and that is corresponding to the group to which the radio access network element belongs.

In this embodiment of the present invention, for the group identifier and the processing policy, refer to any method embodiment corresponding to FIG. 1 to FIG. 7, and details are not described herein in this embodiment of the present invention.

In addition, in another embodiment of the present invention, when the radio access network element management device runs, the processor 901 runs the computer-executable instruction 903, and may execute a method process of the wireless communications system management method according to any one of FIG. 1 to FIG. 7.

An embodiment of the present invention provides a computer readable medium, including a computer-executable instruction, so that when a processor of a computer executes the computer-executable instruction, the computer executes a method process of the wireless communications system management method according to any one of FIG. 1 to FIG. 7.

The LTE network mentioned in the present invention includes an LTE A network and a network of an LTE version that may subsequently appear.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A wireless communications system management method, the method comprising:
    obtaining, by a radio access network element management device, a group identifier of a radio access network element;
    determining, by the radio access network element management device according to a correspondence between a predetermined grouping rule and the group identifier, a group to which the radio access network element belongs, wherein the predetermined grouping rule includes a correspondence between the group identifier and the group to which the radio access network element belongs; and
    using, by the radio access network element management device, a processing policy corresponding to the group to which the radio access network element belongs, wherein:
    the processing policy comprises an operation and maintenance policy that comprises a fault reporting policy including, when a link fault in a to-be-reported group meets a preset condition, reporting alarm information used to indicate that a link fault occurs in the to-be-reported group, and
    the group identifier is used to indicate at least one attribute of:
        an attribute of an area in which the radio access network element is located,
        an attribute of a network standard of the radio access network element,
        an attribute of a service area in which the radio access network element is located,
        an attribute of a radio access technology type of the radio access network element,
        an attribute of an access frequency of the radio access network element,
        a network element form attribute of the radio access network element,
        a deployment form attribute of the radio access network element,
        a network element home attribute of the radio access network element,
        a network element service application attribute of the radio access network element, or
        a network element performance attribute of the radio access network element.

2. The method according to claim 1, wherein the group identifier is at least one of a name of the radio access network element, a link identifier of the radio access network element, an Internet Protocol (IP) address of the radio access network element, or an area attribute identifier of the radio access network element.

3. The method according to claim 1, wherein using the processing policy corresponding to the group to which the radio access network element belongs comprises:
    using, by the radio access network element management device, the processing policy on all radio access network elements in the group to which the radio access network element belongs.

4. The method according to claim 1, wherein the operation and maintenance policy further comprises a signaling tracing policy.

5. The method according to claim 1, wherein the operation and maintenance policy further comprises a performance indicator policy that includes reporting a performance indicator by group or comprises information about a to-be-reported performance indicator.

6. The method according to claim 1, wherein the processing policy further comprises an application policy, and the application policy comprises at least one of a device access policy, a network-side device weight information delivery policy, a resource allocation policy, or a functional characteristic deployment policy.

7. The method according to claim 1, wherein:
    the processing policy further comprises an application policy, and the application policy includes:
    a data flow control policy that comprises a condition for enabling a data flow control function, a priority of enabling a data flow control function, or indication information used to indicate whether to enable a data flow control function; or
    a resource allocation policy that comprises information about a to-be-allocated link parameter, information about a hardware resource, or information about a software resource, wherein:
        the information about the link parameter comprises information about a receive/transmit cache of a Stream Control Transmission Protocol (SCTP) link of an S1 interface,
        the information about the hardware resource comprises information about a board, a memory, a CPU, or a physical port, and
        the information about the software resource comprises information about a process, a thread, a link number, a logical port, or a local IP address.

8. The method according to claim 1, wherein:
the processing policy further comprises an application policy, wherein the application policy comprises at least one of a paging policy, a tracking area identity list (TAList) allocation policy, a user equipment identity allocation policy, a policy for delivering a subscriber profile ID SPID for a radio access technology/frequency selection priority, an area handover restriction policy, a voice policy, a user location reporting policy, or a serving gateway (SGW)/packet data network gateway (PGW) selection policy; and
the user equipment identity comprises at least one of a globally unique temporary identity (GUTI), a mobility management entity code (MMEC), a mobility management entity group identifier (MMEGI), and a public land mobile network (PLMN).

9. The method according to claim 1, wherein the processing policy includes:
a paging policy that comprises information about a quantity of paging retransmission times, information about paging wait duration;
a SPID delivery policy comprises information about a to-be-delivered SPID;
an area handover restriction policy comprises a handover restriction list; or
a SGW/PGW selection policy comprises an IP address or a domain name of an SGW/PGW, or a tracking area identity TAI or an APN for determining an SGW/PGW, or information for determining a TAI/APN, wherein the TAI/APN is used to determine an SGW/PGW.

10. The method according to claim 1, wherein the processing policy further comprises a wireless parameter configuration policy, wherein the wireless parameter configuration policy comprises configuration data for a user network camping priority, configuration data for power control, or configuration data for cell management.

11. A radio access network element management device, comprising:
a memory configured to store a computer-executable instruction;
a receiver coupled to the memory, the receiver configured to obtain a group identifier of a radio access network element; and
a processor coupled to the memory and to the receiver, the processor configured to:
execute the computer-executable instruction stored in the memory;
determine, according to a correspondence between a predetermined grouping rule and the group identifier, a group to which the radio access network element belongs, wherein the predetermined grouping rule includes a correspondence between the group identifier and the group to which the radio access network element belongs; and
use a processing policy corresponding to the group to which the radio access network element belongs, wherein:
the processing policy comprises an operation and maintenance policy that comprises a fault reporting policy including, when a link fault in a to-be-reported group meets a preset condition, reporting alarm information used to indicate that a link fault occurs in the to-be-reported group, and
the group identifier is used to indicate at least one attribute of:
an attribute of an area in which the radio access network element is located,
an attribute of a network standard of the radio access network element,
an attribute of a service area in which the radio access network element is located,
an attribute of a radio access technology type of the radio access network element,
an attribute of an access frequency of the radio access network element,
a network element form attribute of the radio access network element,
a deployment form attribute of the radio access network element,
a network element home attribute of the radio access network element,
a network element service application attribute of the radio access network element, or
a network element performance attribute of the radio access network element.

12. The device according to claim 11, wherein the group identifier is at least one of a name of the radio access network element, a link identifier of the radio access network element, an Internet Protocol IP address of the radio access network element, or an area attribute identifier of the radio access network element.

13. The device according to claim 11, wherein the processor is configured to use the processing policy on all radio access network elements in the group to which the radio access network element belongs.

14. The device according to claim 11, wherein the operation and maintenance policy also comprises a signaling tracing policy.

15. The device according to claim 11, wherein the operation and maintenance policy also comprises a performance indicator policy that includes reporting a performance indicator by group or comprises information about a to-be-reported performance indicator.

16. The device according to claim 11, wherein the processing policy further comprises an application policy, and the application policy comprises at least one of a device access policy, a network-side device weight information delivery policy, a resource allocation policy, or a functional characteristic deployment policy.

17. The device according to claim 11, wherein:
the processing policy further comprises an application policy, and the application policy includes:
a data flow control policy that comprises a condition for enabling a data flow control function, a priority of enabling a data flow control function, or indication information used to indicate whether to enable a data flow control function; or
a resource allocation policy that comprises information about a to-be-allocated link parameter, information about a hardware resource, or information about a software resource, wherein:
the information about the link parameter comprises information about a receive/transmit cache of a Stream Control Transmission Protocol (SCTP) link of an S1 interface;
the information about the hardware resource comprises information about a board, a memory, a CPU, or a physical port; and
the information about the software resource comprises information about a process, a thread, a link number, a logical port, or a local IP address.

18. The device according to claim 11, wherein:
the processing policy further comprises an application policy, wherein the application policy comprises at least one of a tracking area identity list (TAList) allocation policy, a user equipment identity allocation policy, a policy for delivering a subscriber profile ID (SPID) for a radio access technology/frequency selection priority, an area handover restriction policy, a voice policy, a user location reporting policy, or a serving gateway (SGW)/packet data network gateway (PGW) selection policy; and the user equipment identity comprises at least one of a globally unique temporary identity (GUTI), a mobility management entity code (MMEC), a mobility management entity group identifier (MMEGI), and a public land mobile network (PLMN).

19. The device according to claim 11, wherein the processing policy further comprises:
   a paging policy that comprises information about a quantity of paging retransmission times or information about paging wait duration;
   a SPID delivery policy that comprises information about a to-be-delivered SPID;
   an area handover restriction policy that comprises a handover restriction list; or
   a SGW/PGW selection policy that comprises an IP address or a domain name of an SGW/PGW, or a tracking area identity TAI or an APN for determining an SGW/PGW, or information for determining a TAI/APN, wherein the TAI/APN is used to determine an SGW/PGW.

20. The device according to claim 11, wherein the processing policy further comprises a wireless parameter configuration policy, wherein the wireless parameter configuration policy comprises configuration data for a user network camping priority, configuration data for power control, or configuration data for cell management.

* * * * *